US009659245B1

(12) United States Patent
Jeon

(10) Patent No.: US 9,659,245 B1
(45) Date of Patent: May 23, 2017

(54) BAR CODE COPY PREVENTION METHOD AND DEVICE THEREFOR

(71) Applicant: SK Planet Co., Ltd., Seongnam-si, Gyeonggi-do (KR)

(72) Inventor: Jaesic Jeon, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/207,504

(22) Filed: Jul. 12, 2016

(30) Foreign Application Priority Data

Dec. 3, 2015 (KR) .......................... 10-2015-0171550

(51) Int. Cl.
| G06K 7/10 | (2006.01) |
| G06K 19/06 | (2006.01) |
| G06Q 20/32 | (2012.01) |

(52) U.S. Cl.
CPC ..... *G06K 19/0614* (2013.01); *G06K 7/10732* (2013.01); *G06K 19/06037* (2013.01); *G06K 19/06112* (2013.01); *G06Q 20/3274* (2013.01)

(58) Field of Classification Search
USPC .............................. 235/462.01–462.49, 494
See application file for complete search history.

(56) References Cited

U.S. PATENT DOCUMENTS

| 5,367,148 | A | * | 11/1994 | Storch | G06F 11/14 235/375 |
| 2004/0177032 | A1 | * | 9/2004 | Bradley | G06K 17/00 705/38 |
| 2006/0054695 | A1 | * | 3/2006 | Owada | G06K 7/1095 235/440 |
| 2014/0263623 | A1 | * | 9/2014 | Robison | G06K 7/1447 235/380 |
| 2016/0012324 | A1 | * | 1/2016 | Eschbach | G06K 1/121 235/494 |

* cited by examiner

*Primary Examiner* — Daniel Hess
(74) *Attorney, Agent, or Firm* — Hauptman Ham, LLP

(57) ABSTRACT

The present invention relates to a bar code copy prevention method and a device therefor. In detail, when a terminal provides a one-time bar code for an electronic payment, the one-time bar code is provided to a user in a state which a bar code scanner cannot recognize by changing the one-time bar code for the electronic payment, and when the bar code scanner exposes a light source in order to recognize the one-time bar code for the electronic payment, a light source recognition module installed in the terminal recognizes the light source of the bar code scanner, a payment may be performed by recovering an original bar code which the bar code scanner can recognize from the changed bar code, and thus an illegal use of the bar code may be prevented since the payment is not performed using the captured bar code.

19 Claims, 9 Drawing Sheets

BAR CODE COPY PREVENTION METHOD AND DEVICE THEREFOR

CROSS REFERENCE TO RELATED APPLICATION

This application claims the priority of Korean Patent Application No. 10-2015-0171550 filed on Dec. 3, 2015 in the Korean Patent and Trademark Office. This application, in its entirety, is incorporated herein by reference.

TECHNICAL FIELD

The present invention relates to a bar code copy prevention method and a device therefor, and more particularly, to a bar code copy prevention method and device capable of preventing copying of a bar code by bar code capture by changing some or all of the bar code into a state which cannot be recognized by a bar code scanner and outputting the changed bar code when generating a bar code for an electronic payment and outputting the generated bar code to a terminal.

BACKGROUND

Content described in this part merely provide background information related to embodiments of the present invention, and do not configure a conventional art.

A mobile communication terminal has departed from the scope of a conventional simple communication device or an information provision device and has become an essential product of a modern person according to developments of a mobile communication network and a terminal specification, and is evolving as a total entertainment device. Particularly, miniaturization and weight lightening of the mobile communication terminal which is the essential product of the modern person are achieved by continuous development, and also a mobile communication terminal including various functions is becoming a complex mobile communication terminal.

The mobile communication terminal can provide a bar code recognition function, and a bar code which is attached to a product and can be recognized as product information is helpfully being used for automatically arranging sales documents by being read by a bar code scanner included in a cash register or a point of sales (POS) system of a large scale store. A code system is expanded from a one-dimensional arrangement to a two-dimensional arrangement, information capable of being loaded therein is rapidly increasing, and the scope of use is gradually expanding.

Particularly, various electronic payment methods using a bar code by using bar code provision technology in the mobile communication terminal are being attempted, but in order to perform an electronic payment using near field communication (NFC), there are a problem in that a hardware change of the mobile communication terminal is required and an affiliated store payment terminal should be replaced, and accordingly, a bar code in which the hardware change of the mobile communication terminal is not required and a bar code scanner which is already being used can be utilized for recognition of products has been coming into wide use for the electronic payment.

However, in the electronic payment using a bar code, there is a disadvantage in which security is decreased in comparison with NFC, and in order to solve such a disadvantage, a one-time bar code having a short valid time has been developed and applied, but even in an electronic payment using a one-time bar code, another user can perform a payment using a captured bar code after capturing a bar code through a capture function of a mobile communication terminal, cases in which the mobile communication terminal is infected with a malicious code, etc. and personal information is stolen are increasing since it is difficult to differentiate a captured bar code and an original bar code with the naked eye, and thus a risk of an illegal payment is also increasing.

SUMMARY

The present invention is directed to providing a bar code copy prevention method for providing a changed bar code to a user in a state which a bar code scanner cannot recognize by changing some or all of a one-time bar code for an electronic payment when a terminal provides the one-time bar code for the electronic payment, recognizing a light source of the bar code scanner by a light source recognition module installed in a terminal when the bar code scanner exposes the light source in order to recognize the one-time bar code for the electronic payment, and performing a payment by recovering an original bar code which the bar code scanner can recognize from the changed bar code when recognizing the light source, and thus preventing the payment using the captured bar code from being performed even when the bar code is captured before being recognized by the bar code scanner, and a device therefor.

One aspect of the present invention provides a bar code copy prevention method, including: outputting, by a terminal, a second bar code formed in a state which a bar code scanner cannot recognize by changing at least one portion of a first bar code; recognizing, by the terminal, a light source of the bar code scanner; recovering the first bar code from the second bar code by undoing a change of the second bar code when the terminal recognizes the light source; and outputting the first bar code instead of the second bar code.

In this case, before the outputting of the second bar code, the bar code copy prevention method may further include: transmitting user authentication information input from a user to a bar code provision server; receiving the first bar code generated by the bar code provision server from the bar code provision server; and changing the received first bar code into the second bar code. The first and second bar codes may be one-time bar codes for an electronic payment, and the one-time bar code may have a valid payment time for which an electronic payment using the one-time bar code is available to be performed.

Further, the second bar code may be the first bar code of which at least one portion is changed to a color which the bar code scanner 200 cannot recognize, or may be formed by a letter or a shape which the bar code scanner cannot recognize being displayed to overlap at least one portion of the first bar code.

Moreover, the recognizing of the light source of the bar code scanner may recognize the light source exposed by the bar code scanner towards a front surface of the terminal in order to recognize the second bar code, and before the outputting of the second bar code, the bar code copy prevention method may further include: generating, by the terminal, a first bar code; and changing the first bar code into the second bar code.

Meanwhile, the bar code copy prevention method may be provided as a computer readable recording medium in which a program executing the method is recorded, and may be provided as a computer program which is implemented to execute the method and is stored in a computer readable recording medium.

Another aspect of the present invention provides a terminal, including: a light source recognition module configured to recognize a light source of a bar code scanner; an output module configured to expose a bar code to a user; and a control module configured to control the terminal to recognize the light source of the bar code scanner through the light source recognition module when outputting a second bar code formed in a state which the bar code scanner cannot recognize by at least one portion of a first bar code being changed through the output module, to undo a change of the second bar code, to recover the first bar code from the second bar code, and to output the first bar code instead of the second bar code through the output module.

In this case, the terminal may further include: a communication module configured to transceive data with a bar code provision server, wherein, when transmitting user authentication information input from the user to the bar code provision server through the communication module, the control module may receive the first bar code generated by the bar code provision server from the bar code provision server, and change the received first bar code into the second bar code. The first and second bar codes may be one-time bar codes for an electronic payment, and the one-time bar code may have a valid payment for which an electronic payment using the one-time bar code is available to be performed.

Further, the second bar code may be the first bar code of which at least one portion of the first bar code is changed to a color which the bar code scanner 200 cannot recognize, or be formed by a letter or a shape which the bar code scanner cannot recognize being displayed to overlap at least one portion of the first bar code.

The control module may control the light source recognition module to be operated when the second bar code is exposed to the user, and control the light source recognition module to maintain an operation of the light source recognition module until the first bar code is recovered from the second bar code, and the light source recognition module may be installed in a front surface of the terminal.

According to the present invention, a changed bar code is provided to a user in a state which a bar code scanner cannot recognize by changing some or all of a one-time bar code for an electronic payment when a terminal provides the one-time bar code for the electronic payment, a light source of the bar code scanner is recognized by a light source recognition module installed in the terminal when the bar code scanner exposes the light source in order to recognize the one-time bar code for the electronic payment, a payment is performed by recovering an original bar code which the bar code scanner can recognize from the changed bar code, and a payment does not performed by using the captured bar code from being performed even when the bar code is captured before being recognized by the bar code scanner, and thus prevents the use of an illegal bar code due to copying the bar code That is, when the one-time bar code for the electronic payment is initially provided to the user, the one-time bar code may be provided in the state which the bar code scanner cannot recognize, and the illegal use by copying the bar code may be prevented by preventing the bar code from being used even when the bar code is stolen due to a malicious code infection, capture, etc. before a payment time by changing the bar code into a state which the bar code scanner can recognize at the payment time.

Further, various effects in addition to the effects described above will be directly or indirectly disclosed in a detailed description according to embodiments of the present invention which will be described hereinafter.

DETAILED DESCRIPTION

Figure 1:
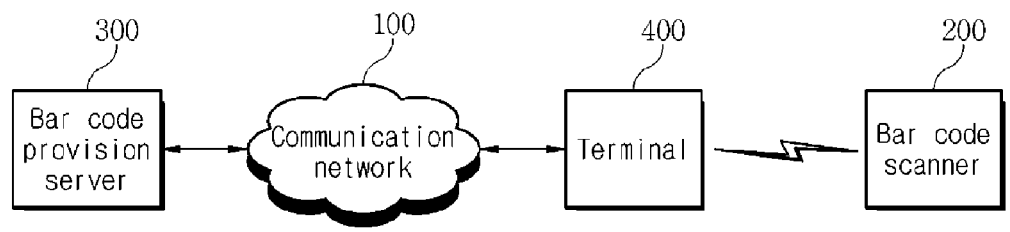
FIG. 1 a diagram illustrating a configuration of a bar code copy prevention system according to an embodiment of the present invention.

In order to more clearly understand the above and other objects and features and advantages of the present invention, the present invention will be described in detail with reference to embodiments shown in the accompanying drawings.

In the following description and the accompanying drawings, detailed descriptions of well-known functions or constructions that may obscure the point of the invention will be omitted. Further, through the accompanying drawings, it should be noted that the same reference numeral is used for the same component, if possible.

The terms used in the following description and the accompanying drawings are not to be construed as limited to general and dictionary meanings, but should be interpreted as the meanings and concepts corresponding to the technical scope of the present invention on the basis of the principle that the inventor is allowed to define terms appropriately for the best explanation.

Therefore, since a configuration of the embodiments described and the drawings shown herein is just a preferable example and does not describe and show every technical scope of the invention, it should be understood that there could be various equivalents and modifications which can replace the embodiments in the present application point.

Further, although the terms first, second, etc. are used in order to describe various elements, the terms may be used herein in order to differentiate one element from another element, and the scope of the present invention is no to be construed as limited by these terms.

For example, without departing from the scope of the present invention, a first element could be termed a second element, and similarly, a second element could be termed a first element.

Further, the terms used herein are merely used for describing embodiments of the invention and are not intended to limit the scope of the invention.

Unless otherwise clearly defined, the use of the singular form in the present document does not preclude the presence of more than one referent. In addition, it should be further understood that the terms "comprises," "comprising," "includes," and/or "including," when used herein, specify the presence of stated features, numbers, steps, operations, elements, components and/or groups thereof, but do not preclude the presence or addition of one or more other features, numbers, steps, operations, elements, components, and/or groups thereof.

Further, the terms " . . . unit", " . . . device", "module", etc. used herein may refer to a unit of processing one or more functions or operations, and may be implemented by hardware or software, or a combination thereof.

Moreover, in the context describing the present invention (particularly, in the context of the claims below), unless otherwise clearly refuted, the articles "a," "an," "the", and analogous terms thereof are singular in that they have a single referent, however the use of the singular form in the present document does not preclude the presence of more than one referent.

In addition to the terms described above, specific terms used hereinafter are provided to help the understanding of the present invention, and the specific terms may be changed into other terms without departing from the technical spirit of the present invention.

Moreover, embodiments of the present invention may include a computer readable medium including or transmitting a computer executable command or a data structure stored in a computer readable medium.

The computer readable medium may be an arbitrary available medium which is able to be accessed by a general-purpose or special-purpose computer system. As an example, the computer readable medium may be a random access memory (RAM), a read-only memory (ROM), an erasable programmable ROM (EPROM), a compact disk ROM (CD-ROM), an optical disk storage device, a magnetic disk storage device, or a magnetic storage device, may be used for storing or transmitting a predetermined program code means configured in the form of a computer executable command, a computer readable command, or a data structure, and may include a physical storage medium such as an arbitrary medium which can be accessed by a general-purpose or specific-purpose computer system, but is not limited thereto.

Further, the present invention may be performed in a network computing environment having configurations of various forms of computer systems such as a personal computer (PC), a laptop computer, a handheld device, a multiprocessor system, microprocessor-based or programmable consumer electronics, a network PC, a mini computer, a mainframe computer, a mobile phone, a personal digital assistant (PDA), a pager, etc.

Further, the present invention may be executed in a distributed system environment in which all of local and remote computer systems linked by a wired data link, a wireless data link, or a combination of wired and wireless data links performs a task through the network. In the distributed system environment, a program module may be located in a local memory storage device and a remote memory storage device.

Meanwhile, a bar code generated to perform an electronic payment in an embodiment of the present invention may be referred to as a first bar code, and a bar code formed in a state which a bar code scanner cannot recognize by some or all of the first bar code being changed in various manners in order to prevent the first bar code from being copied may be referred to as a second bar code.

Hereinafter, a device for preventing a bar code from being copied in a bar code copy prevention system according to an embodiment of the present invention will be described in detail with reference to the accompanying drawings.

FIG. 1 is a diagram schematically illustrating a configuration of a bar code copy prevention system according to an embodiment of the present invention.

Referring to FIG. 1, a bar code copy prevention system according to an embodiment of the present invention may include a bar code scanner 200, a bar code provision server 300, and a terminal 400.

Here, the terminal 400 may be connected to the bar code provision server 300 through a communication network 100.

Now, each component will be schematically described with reference to FIG. 1.

First, the communication network 100 may perform a function of transceiving data between the terminal 400 and the bar code provision server 300, and according to a system implementation method, a wired communication method such as Ethernet, an x digital subscriber line (xDSL) (an asymmetric DSL (ADSL) or a very high bit rate DSL (VDSL)), a hybrid fiber coaxial (HFC) cable, a fiber to the curb (FTTC), a fiber to the home (FTTH), etc. may be used, and a wireless communication method such as a wireless local area network (WLAN), wireless-fidelity (Wi-Fi), long term evolution (LTE), LTE-advanced (LTE-A), etc. may be used.

Further, for example, the communication network 100 may include a plurality of connection networks (not shown) and a core network (not shown), and be configured to include an external network, for example, the Internet (not shown).

Here, the connection network (not shown) may be a connection network performing wired or wireless communication with the terminal 400, and for example, may be implemented by a plurality of base stations (BSs) such as a BS, a base transceiver station (BTS), a NodeB, an eNodeB, etc., and a BS controller (BSC) such as a BSC, a radio network controller (RNC), etc.

Further, as described above, a digital signal processing unit and a wireless signal processing unit which are integrally implemented in the BS may be classified into a digital unit (referred to as DU below) and a radio unit (referred to as RU below) (not shown), respectively, a plurality of RUs (not shown) may be installed in a plurality of regions, and the plurality of RUs (not shown) may be configured by being connected to a centralized DU (not shown).

Further, the core network (not shown) configuring a mobile network together with the connection network (not shown) may perform a function of connecting the connection network (not shown) and the external network, for example, an Internet network (not shown).

As described above, the core network (not shown) may be a network system performing a main function for a mobile communication service of mobility control, switching, etc. between the connection networks (not shown), perform circuit switching or packet switching, and manage and control a packet flow in the mobile network. Further, the core network (not shown) may perform a function of managing mobility between frequencies, and a function for traffic in the connection network (not shown) and the core network (not shown) and an interwork with another network, for example, the Internet network (not shown).

The core network (not shown) may further include a serving gateway (SGW), a public data network (PDN)

gateway (PGW), a mobile switching center (MSC), a home location register (HLR), a mobile mobility entity (MME), and a home subscriber server (HSS), etc.

In addition, the Internet (not shown) may refer to a generally well-known communication network in which information is exchanged according to a transmission control protocol/Internet protocol (TCP/IP) protocol, that is, a common network, may be connected to the terminal 400, provide information provided from the terminal 400 to the bar code provision server 300 through the core network (not shown) and the connection network (not shown), or alternatively, provide service request information provided from the bar code provision server 300 to the terminal 400 through the connection network (not shown) and the core network (not shown). However, the Internet may not be limited thereto, and the bar code provision server 300 may be integrally implemented with the core network (not shown).

Further, in addition to a communication method described above, all kinds of communication methods which are well known or will be developed in the future may be included.

The bar code scanner 200 may refer to an input device which reads an electronic signal generated according to an intensity of reflected light by radiating light on a bar code which is printed or is output on a screen of the terminal 400.

The bar code may be a code obtained by combining bars having different thicknesses instead of a general code, the bar code scanner 200 may optically read the bar code and input the bar code to a computer, and a material input using the bar code and the bar code scanner 200 is widely used since the material input is accurate and convenient to use.

The bar code scanner 200 may irradiate a light source (light) on the bar code in order to read information included in the bar code, but in the present invention, since it is determined that a user wants to perform an electronic payment when the bar code scanner 200 irradiates the light source on the bar code, whether to recover from a changed bar code may be determined by determining whether the light source generated from the bar code scanner 200 is to read the bar code.

The bar code provision server 300 may transmit a first bar code for an electronic payment or a second bar code in which some or all of the first bar code is changed to the state which the bar scanner cannot recognize to the terminal 400 by a request of the terminal 400.

In detail, in the present invention, the bar code provision server 300 may generate a bar code as a one-time bar code when generating the bar code for an electronic payment, and transmit the generated one-time bar code to the terminal 400 by setting a valid time which is a time for which the electronic payment may be performed from a time at which the terminal 400 receives the first bar code or the second bar code, or a time for which the electronic payment may be performed from a time at which the first bar code is recovered from the received second bar code.

Further, the bar code provision server 300 according to the present invention may recover the first bar code from the second bar code by recognizing the light source of the bar code scanner 200 by the terminal 400, receive bar code payment information recognized by the bar code scanner 200 from a point of sale (POS) terminal (not shown) connected to the bar code scanner 200, process the electronic payment which the user wants to perform, and transmit the process results to the terminal 400.

However, the electronic payment process may not necessarily be performed by the bar code provision server 300, and a separate payment server (not shown) may receive and process the payment information from the POS terminal (not shown).

A memory installed in each device of the present invention may store information in the device. In one implementation, the memory may be a computer readable medium. In another implementation, the memory may be a volatile memory unit, and in still another implementation, the memory may be a non-volatile memory unit.

In one implementation example, the storage device may be a computer readable medium. In various other implementation examples, for example, the storage device may include a hard disk device, an optical disk device, or any other mass storage device.

Although a configuration of an exemplary device is described in the present specification and drawings, implementations of a functional operation and a subject described herein may be implemented in other types of digital electronic circuits, or by computer software, firmware, or hardware including the configuration disclosed herein and its structural equivalents thereof, or a combination of one or more among of the above.

Implementations of the subject described herein may be implemented by one or more computer program products, in other words, one or more modules related to a computer program command encoded on a tangible program storage medium for controlling an operation of the device according to the present invention or executing the operation.

The computer readable medium may be a machine readable storage device, a machine readable storage board, a memory device, a composite of a material influencing a machine readable radio wave signal, or a combination of one or more among the above.

The terminal 400 may refer to a device of a user capable of transceiving various data through the communication network 100 according to a manipulation of the user. The terminal 400 may perform voice or data communication through the communication network 100 and transceive information through the bar code provision server 300 and the communication network 100.

For this, the terminal 400 of the present invention may include a memory storing a program and a protocol for a transceiving and copy protection of bar code information and payment processing, and a microprocessor for performing calculation and control operations by executing various kinds of programs, etc.

The terminal 400 may preferentially perform a connection to an application provision device (not shown) connected to the communication network 100, for example, an application store, etc., and receive and install an electronic payment application using a bar code copy prevention method according to the present invention from a corresponding application store. The terminal 400 may execute the electronic payment application, recognize the light source of the bar code scanner 200, recover a bar code in a form which may perform payment, and perform the electronic payment.

In this case, the terminal 400 according to an embodiment of the present invention may output the second bar code formed in the state which the bar code scanner 200 cannot recognize by changing some or all of the first bar code which the bar code scanner 200 can recognize to normally process the payment.

In this case, the first bar code or the second bar code may be received and output from the bar code provision server 300 by a request of the terminal 400, and the terminal 400 may directly generate the first bar code and output the second bar code generated by changing some or all of the first bar code.

That is, the terminal 400 may output the second bar code by receiving the first bar code from the bar code provision server 300 and changing the first bar code into the second bar code, and output the second bar code by receiving the second bar code and information related to the recovered first bar code from the bar code provision server 300, and the terminal 400 may directly generate the first bar code, and output the second bar code by changing the first bar code into the second bar code.

Further, the second bar code output to the terminal 400 and changed into the state which the bar code scanner 200 cannot recognize may be the first bar code of which at least one portion is changed so as to have a color which the bar code scanner 200 cannot recognize.

That is, the bar code scanner 200 may sense every color of a red series as a white color since the bar code scanner 200 reads a bar code using a red laser beam, and accordingly, since the bar code scanner 200 cannot read the bar code when a bar code having the color of the red series is output on a white or yellow background, the bar code scanner 200 cannot recognize a captured bar code even when an output second bar code is captured by outputting the second bar code generated by changing a background of the bar code to the white color or a yellow color and changing the first bar code to the color of the red series in the terminal 400. Subsequently, when the terminal 400 recognizes the light source of the bar code scanner 200, the terminal 400 may recover the first bar code which is in a form capable of being read by the bar code scanner 200 by changing the background into a color of a bright white series and changing the bar code into a color of a dark black series.

Meanwhile, in addition to the method of changing the color, the bar code scanner 200 cannot recognize the second bar code as a bar code by the second bar code being output having a shape such as a letter, a watermark, etc. overlapping some or all of the first bar code.

In this case, when the terminal 400 recognizes the light source of the bar code scanner 200, the bar code scanner 200 may read the first bar code by recovering the first bar code by removing the shape such as the letter, the watermark, etc. displayed in the second bar code, or by moving the shape in an upper or lower direction of the bar code.

In addition to the embodiment described above, when a bar code is changed into the state which the bar code scanner 200 cannot recognize, the bar code may be utilized as the second bar code even when changed into any form.

Further, the bar code may be a one-time bar code for an electronic payment, and in this case, a valid payment time which is a time for which the electronic payment using the one-time bar code may be performed may be set.

In this case, the valid payment time may be counted from a time at which the terminal 400 generates the first bar code or a time at which the first bar code or the second bar code is received from the bar code provision server 300, and be counted from a time at which the first bar code is recovered from the second bar code by recognizing the light source of the bar code scanner 200.

After outputting the second bar code, when recognizing the light source of the bar code scanner 200, the terminal 400 may undo the change of the second bar code, recover the first bar code capable of being recognized by the bar code scanner 200 from the second bar code, and output the first bar code.

In this case, since the object of the present invention is more effectively achieved when the terminal 400 should only sense that the bar code scanner 200 exposing the light source for an electronic payment and recovers the first bar code from the second bar code, the terminal 400 may determine whether the bar code scanner 200 exposes the light source for the electronic payment, exposes the light source for a payment of another terminal or product, or exposes the light source due to an erroneous operation.

When the bar code scanner 200 exposes the light source for the electronic payment of the terminal 400, since the light source is exposed toward a front surface of the terminal 400 at which an output module for outputting the second bar code is located, the terminal 400 may recognize and determine whether the light source of the bar code scanner 200 is exposed toward the front surface of the terminal 400 through a light source recognition module installed in the front surface of the terminal 400, and output the first bar code by recovering the first bar code from the second bar code when it is determined that the light source of the bar code scanner 200 is exposed toward the front surface of the terminal 400.

The terminal 400 of the present invention may be implemented in various shapes. For example, the terminal 400 described herein may be a mobile terminal such as a smart phone, a tablet PC, a PDA, a portable multimedia player (PMP), a MP3 player, etc. as well as a fixed terminal such as a smart television (TV), a desktop computer, etc.

Further, the terminal 400 of the present invention may not be enumerated since a variant of a mobile device is very diverse according to a convergence trend of a digital device, but a unit of the same level as the units described above may be used as the terminal 400 of the present invention, and, any device may be used as the terminal 400 according to an embodiment of the present invention as long as it is capable of downloading and installing a bar code copy prevention application according to the present invention.

The configuration of the bar code copy prevention system according to an embodiment of the present invention was schematically described above.

Hereinafter, a configuration and an operation of the bar code provision server 300 according to the present invention in the configuration of the system will be described.

Figure 2:
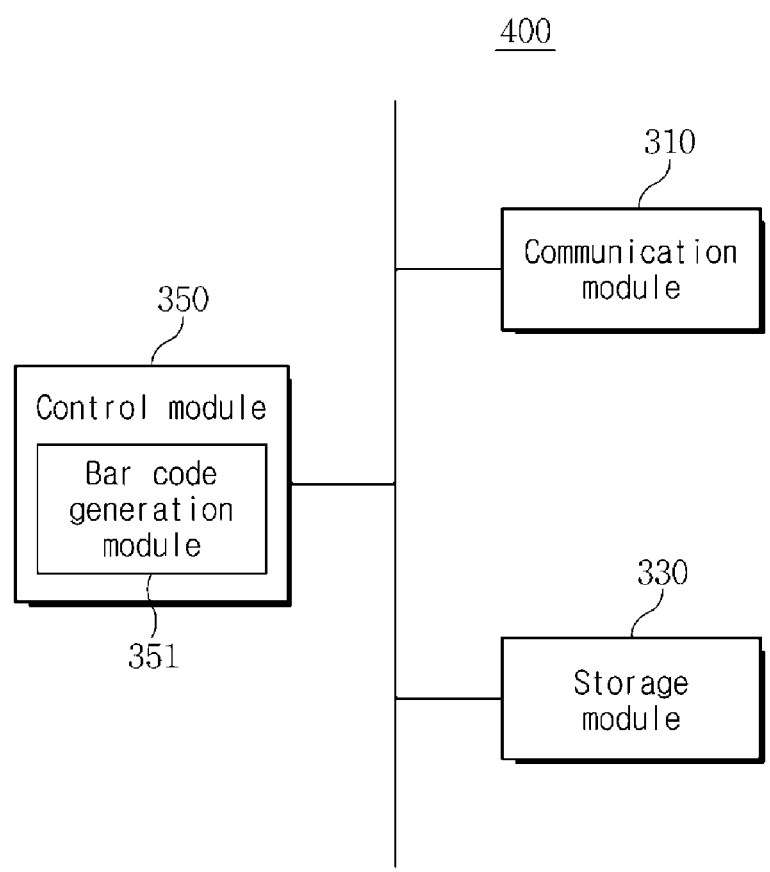
FIG. 2 is a block diagram illustrating a configuration of a bar code provision server according to an embodiment of the present invention.
Figure 3:
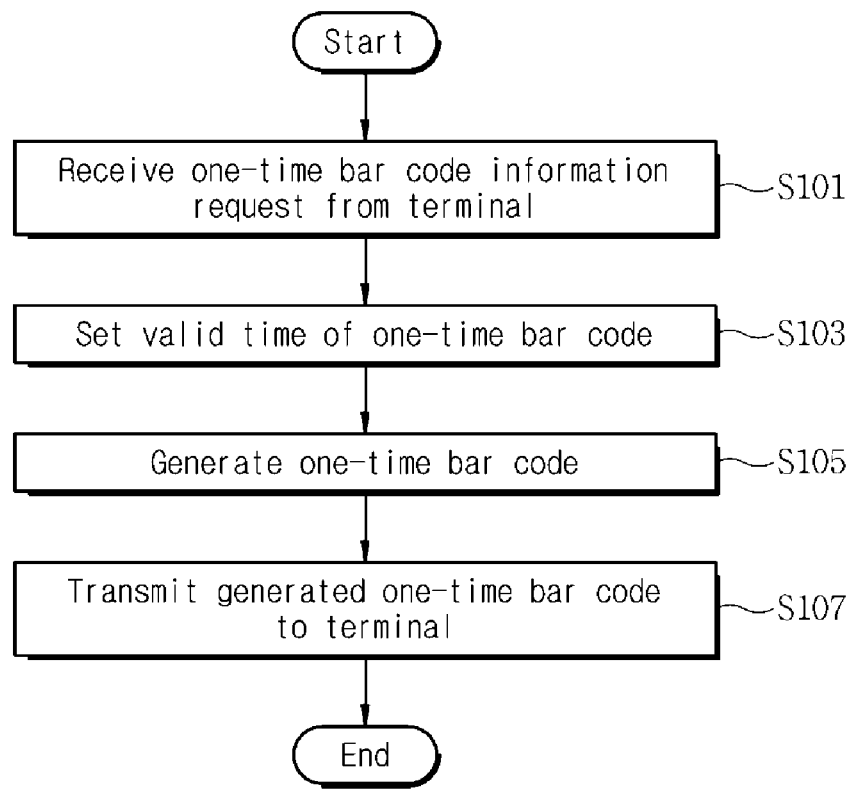
FIG. 3 is a flowchart for describing an operation of a bar code provision server according to an embodiment of the present invention.

FIG. 2 is a block diagram illustrating a main configuration of the bar code provision server 300, and FIG. 3 is a flowchart for describing an operation of the bar code provision server 300 according to an embodiment of the present invention.

First, referring to FIG. 2, the bar code provision server 300 according to the present invention may include a communication module 310, a storage module 330, and a control module 350.

The communication module 310 may be for communicating with the terminal 400, a communication network which performs a function of the communication module 310 may desirably use a wireless communication method such as a WLAN, Wi-Fi, wireless broadband Internet (Wibro), world-wide interoperability microwave (Wimax), high speed downlink packet access (HSDPA), etc. but is not limited thereto, or use a wired communication method such as Ethernet, an xDSL (ADSL, VDSL), an HFC, an FTTC, an FTTH, etc. according to an implementation method.

In detail, the communication module 310 according to the present invention may receive a bar code transmission request from the terminal 400 through the communication network 100, and transmit information for the first bar code or information for recovering the first bar code from the second bar code and the second bar code.

Also, when the first bar code and the second bar code are one-time bar codes for an electronic payment, information related to a valid payment time for which the one-time bar code may be used may also be transmitted.

The storage module 330 may be a device for storing data, may include a main storage device and an auxiliary storage device and store an application program needed for performing a function of the terminal 400. The storage module 330 may mainly include a program region and a data region. Here, when activating each function in response to a request of a user, the terminal 400 may provide each of the functions by executing corresponding application programs under control of the control module 350.

In detail, the storage module 330 of the present invention may store a variety of information for generating a bar code.

The control module 350 may generate the first bar code, change the first bar code into the second bar code, transmit the second bar code to the terminal 400, and control an overall operation of the bar code provision server 300.

A method through which the control module 350 described above controls the overall operation of the bar code provision server 300 will be described with reference to FIG. 3.

When describing an operation of the bar code provision server 300 according to an embodiment of the present invention with reference to FIG. 3, the bar code provision server 300 may receive a bar code transmission request from the terminal 400 (S101). In this case, a requested bar code may be a one-time bar code generated for an electronic payment.

Further, when receiving the bar code transmission request, the bar code provision server 300 may also receive user authentication information which a user inputs to the terminal 400 for the electronic payment.

The bar code provision server 300 may generate a one-time bar code by setting a valid payment time which is a time for which the one-time bar code may be used and assigning the set valid payment time to the one-time bar code (S103 to S105).

In this case, the bar code may be generated based on the received user authentication information.

Subsequently, the generated one-time bar code may be transmitted to the terminal 400, and in this case, the generated one-time bar code may be directly transmitted, or be transmitted by being changed into a second bar code formed in the state which the bar code scanner 200 cannot recognize.

When transmitting the generated one-time bar code by changing it into the second bar code, the terminal 400 may transmit the second bar code and also information for recovering a first bar code so as to recover the first bar code formed in the state which the bar code scanner 200 can recognize, that is, a state which is initially generated by the bar code provision server 300 (S107).

The overall operation of the bar code provision server 300 described above may be generally controlled and performed by the control module 350 of the bar code provision server 300.

The configuration and the operation of the bar code provision server 300 according to the present invention were described above.

Hereinafter, a configuration and an operation of the terminal 400 according to the present invention will be described.

Figure 4:
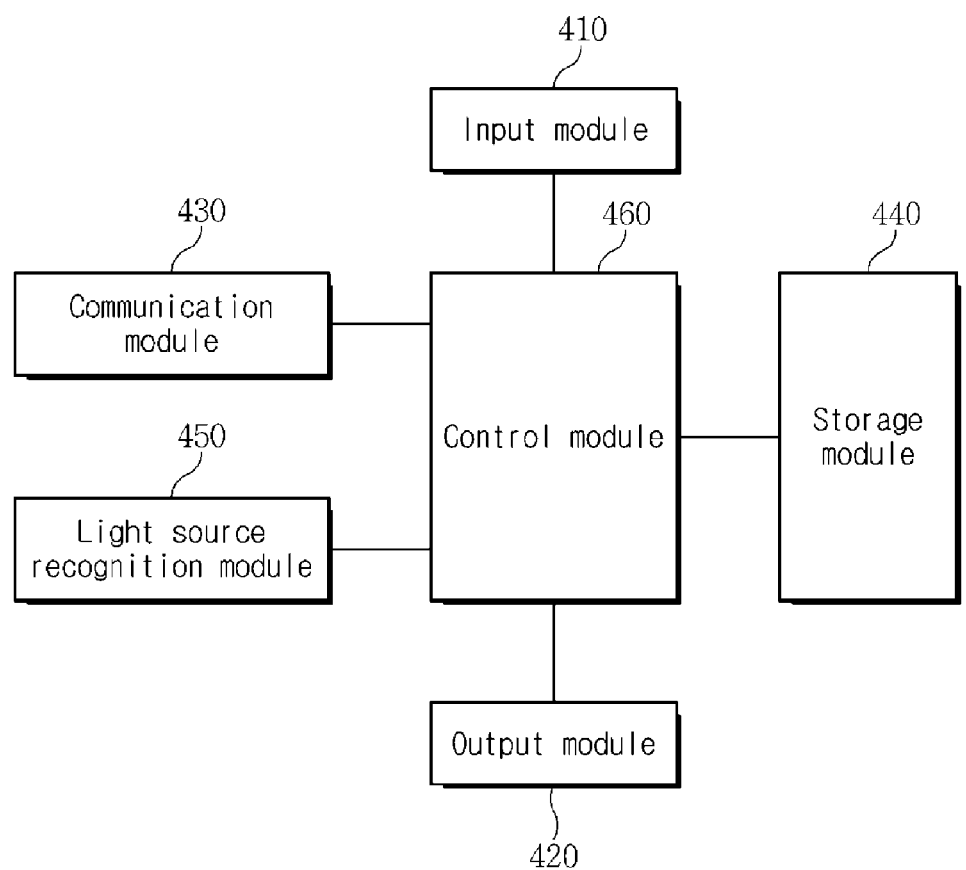
FIG. 4 is a block diagram illustrating a configuration of a terminal according to an embodiment of the present invention.
Figure 5:
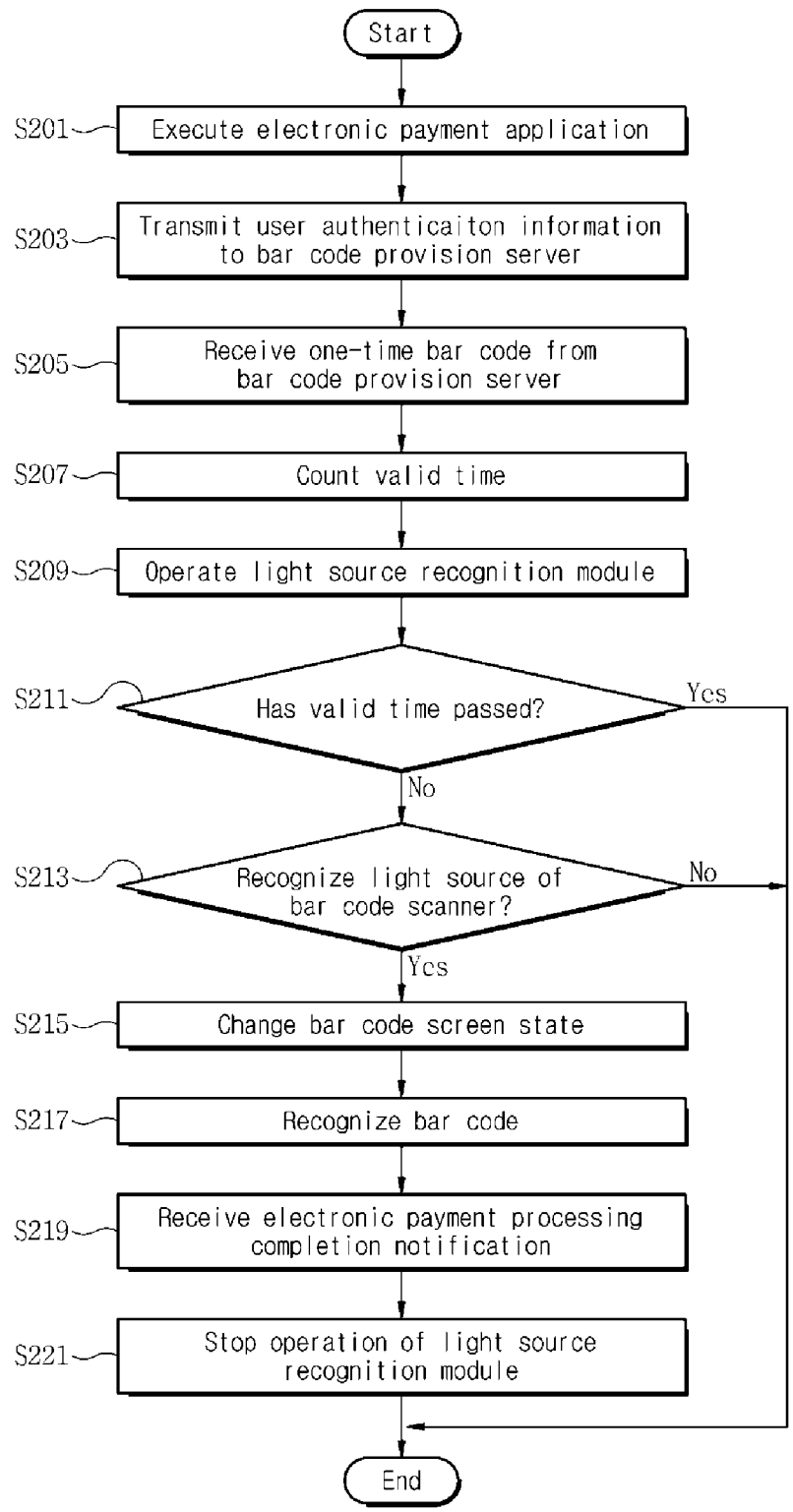
FIG. 5 is a flowchart for describing an operation of a terminal according to an embodiment of the present invention.

FIG. 4 is a block diagram illustrating a main configuration of the terminal 400, and FIG. 5 is a flowchart for describing an operation of the terminal 400 according to an embodiment of the present invention.

First, referring to FIG. 4, the terminal 400 according to the present invention may include an input module 410, an output module 420, a communication module 430, a storage module 440, a light source recognition module 450, and a control module 460.

The input module 410 may receive a variety of information such as number or letter information, and transmit an input signal related to a setting of various kinds of functions and a function control of the terminal 400 to the control module 460.

Further, the input module 410 may be configured to have at least one of a keypad and a touch pad generating an input signal according to a touch or manipulation of the user. In this case, the input module 410 may be configured in the form of one touch panel (or a touch screen) together with the output module 430 and simultaneously perform input and display functions. Further, the input module 410 may be any kind of input means which will be developed in the future in addition to the input device such as a keyboard, a keypad, a mouse, a joystick, etc.

In detail, the input module 410 according to the present invention may sense input information input from the user and transmit the sensed input information to the control module 460.

In detail, the terminal 400 of the present invention may receive user authentication information for receiving an electronic payment request from a user through the input module 410.

The output module 420 may display information related to a series of operating states and operating results generated while a function of the terminal 400 is performed.

Further, the output module 420 may display a menu of the terminal 400 and data input by the user, etc.

Here, the output module 420 may be configured as a liquid crystal display (LCD), a thin film transistor LCD (TFT LCD), a light emitting diode (LED), an organic LED (OLED), an active matrix OLED (AMOLED), a retina display, a flexible display, a three-dimensional display, etc.

In this case, when the output module 420 is configured in the form of the touch screen, the output module 420 may perform some or all of the functions of the input module 410.

In detail, in the present invention, the first bar code and the second bar code may be output to the user through the output module 420, and after an input information window for an electronic payment and the electronic payment are performed, the electronic payment processing result may be output and provided to the user through the output module 420.

The communication module 430 may be a device which transceives data with the bar code provision server 300 through the communication network 100.

Further, the communication module 430 may include a radio frequency (RF) transmitter for modulating a transmitted signal to have a high frequency and amplifying the signal, a RF receiver for amplifying a received signal to have a low noise and demodulate the received signal to have a signal frequency, and a data processor means for processing a communication protocol according to a specific communication method.

The communication module 430 may include at least one of a wireless communication module (not shown) and a wired communication module (not shown). Further, the wireless communication module may be configured to transceive data according to a wireless communication method, and when the terminal 400 uses wireless communication, the terminal 400 may transceive data with the bar code provision server 300 using any one of a wireless network communication module, a wireless LAN communication module, and a wireless personal area network (PAN) communication module.

Here, as described above, the communication module 433 may use a wireless communication method such as a WLAN, Wi-Fi, Wibro, Wimax, HSDPA, etc.

In detail, in the present invention, the user authentication information and the bar code transmission request may be transmitted to the bar code provision server 300 through the communication module 430, and the first bar code or the information for recovering the first bar code and the second bar code which are generated by the bar code provision server 300 may be received.

Further, when the bar code provision server 300 processes an overall operation of an electronic payment, the bar code provision server 300 may transmit information for processing the electronic payment and receive an electronic payment processing result through the communication module 430.

The storage module 440 may be a device which stores data, may include a main storage device and an auxiliary storage device, and may store an application program needed for performing the function of the terminal 400. The storage module 440 may mainly include a program region and a data region. Here, when activating each function in response to a request of the user, the terminal 400 may provide each of the functions by executing corresponding application programs under the control of the control module 460.

In detail, the storage module 440 according to the present invention may store an operating system (OS) which boots up the terminal 400, an application program for preventing a bar code from being copied, user authentication information and payment information corresponding to the user authentication information, etc.

Further, the storage module 440 may store a histogram of the light source having a color of a red or green series when there is or is not the light source of the bar code scanner 200.

The light source recognition module 450 may be a device which recognizes the light source of the bar code scanner 200.

The light source recognition module 450 may be installed in a front surface of the terminal 400 so as to recognize that the bar code scanner 200 exposes the light source toward the output module 420 installed in the front surface of the terminal 400 in which the bar code is output in order to recognize the bar code for the electronic payment.

Further, since a battery of the terminal 400 is excessively consumed when the light source recognition module 450 is always turned on, when the second bar code formed in the state which the bar code scanner cannot recognize is exposed to the user through the output module 420, in order to prevent the battery consumption, the light source recognition module 450 may be operated, recognize the light source of the bar code scanner 200, and the operation of the light source recognition module 450 may be maintained until the first bar code is recovered from the second bar code.

That is, when the first bar code is recovered from the second bar code, the operation of the light source recognition module 450 may be stopped.

Further, the bar code scanner 200 may recognize the recovered first bar code and the operation of the light source recognition module 450 may be stopped when an electronic payment operation is completed.

Moreover, when the light source recognition module 450 is operated, the control module 460 of the terminal 400 may analyze whether the light source of the bar code scanner 200 exists, and in this case, the control module 460 may mainly analyze the histogram of the light source having the color of the red or green series, compare histograms of cases in which the light source of the bar code scanner 200 exists and doesn't exist, and determine whether the light source of the bar code scanner 200 exists.

Meanwhile, for example, the light source recognition module 450 may representatively be a camera.

When the second bar code is exposed through the output module 420 using a camera installed in the front surface of the terminal 400 as the light source recognition module 450 of the present invention, whether the light source of the bar code scanner 200 exists may be recognized by operating the camera, and the operation of the camera may be stopped when the electronic payment operation is completed.

The light source recognition module 450 is not limited to the camera, and any device capable of recognizing the light source of the bar code scanner 200 may be installed in the terminal 400 as the light source recognition module 450 according to the present invention.

The control module 460 may be a processor driving an OS and each component.

Accordingly, the control module 460 of the terminal 400 may control the terminal 400 to transmit a signal input through the input module 410 to the bar code provision server 300 through the communication module 430, control the terminal 400 to expose information received from the bar code provision server 300 received through the communication module 430 through the output module 420, and control the terminal 400 to store the information and data in the storage module 440.

That is, the control module 460 may control an overall operation of the terminal 400, and an overall operation of the terminal 400 controlled by the control module 460 will be described with reference to FIG. 5.

Referring to FIG. 5, the terminal 400 may execute an electronic payment application according to a request of a user (S201), receive user authentication information from the user through the input module 410, and transmit the user authentication information to the bar code provision server 300 (S203).

When the user authentication information is identical to user authentication information which is previously stored, a bar code for the electronic payment may be received from the bar code provision server 300 (S205).

In this case, the bar code may be a one-time bar code generated by the bar code provision server 300, the first bar code which the bar code scanner 200 can recognize, or the second bar code changed into the form which the bar code scanner 200 cannot recognize, and when the terminal 400 receives the second bar code, it may also receive information for recovering the first bar code.

When the terminal 400 receives the first bar code, the terminal 400 may change the first bar code into the second bar code and output the second bar code to the output module 420.

Further, while receiving the bar code, information related to a valid payment time for which the one-time bar code may be used may also be received from the bar code provision server 300.

However, when the bar code is not received from the bar code provision server 300 and the user authentication is completed, the terminal 400 may directly generate the first bar code, and change the first bar code into the second bar code formed in the state which the bar code scanner 200 cannot recognize.

After this, the terminal 400 outputs the second bar code through the output module 420, and the second bar code may be the first bar code of which at least one portion is changed into a color which the bar code scanner 200 cannot recognize.

That is, the bar code scanner 200 may sense every color of the red series as the white color since the bar code scanner 200 reads the bar code using a red laser beam, and accordingly, since the bar code scanner 200 cannot read the bar code when a bar code having the color of the red series is output on a white or yellow background, the bar code scanner 200 cannot recognize a captured bar code even when an output second bar code is captured by outputting the second bar code generated by changing a background of the bar code to the white color or the yellow color and changing the bar code into the color of the red series in the terminal 400.

Meanwhile, the bar code scanner 200 cannot recognize the second bar code as a bar code by the second bar code being output having a shape such as a letter, a watermark, etc. overlapping some or all of the first bar code.

In addition to the embodiment described above, any bar code may be used as the second bar code as long as the bar code is changed into the state which the bar code scanner 200 cannot recognize.

When the changed bar code is output through the output module 420 of the terminal 400, the valid payment time may be counted according to a predetermined valid payment time (S207), and the light source recognition module 450 for recognizing the light source of the bar code scanner 200 may be operated (S209).

When the light source recognition module 450 does not recognize the light source of the bar code scanner 200 within the predetermined valid payment time, the electronic payment operation according to the present invention may be completed, and when the light source recognition module 450 recognizes the light source of the bar code scanner 200 within the predetermined valid payment time, a screen state of the bar code may be changed from the second code to the first bar code (S211 to S215).

In this case, since the light source recognition module 450 recognizes the light source which the bar code scanner 200 exposes in order to read the bar code for the electronic payment and does not need to recognize the light source due to an erroneous operation or the light source for performing an electronic payment by another product or another terminal, the light source recognition module 450 may recognize only the light source exposed by the bar code scanner 200 to read the bar code for the electronic payment, that is, the light source exposed to recognize the second bar code. Accordingly, since the second bar code is output through the output module 420 installed in the front surface of the terminal 400, the light source recognition module 450 may be installed in the front surface of the terminal 400 and recognize the light source exposed toward the front surface of the terminal 400, and thus the screen state of the bar code may be changed from the second bar code to the first bar code by recognizing the light source exposed to recognize the second bar code.

That is, when the second bar code is a bar code in which at least one portion of the first bar code is changed into a color which the bar code scanner 200 cannot recognize, the first bar code in which the background has the color of the bright white series and the bar code has the color of the dark black series which is a form which the bar code scanner 200 can recognize may be recovered by being recognized by the light source of the bar code scanner 200, and when the second bar code is formed by a shape such as a letter, a watermark, etc. overlapping at least portion of the first bar code, the bar code scanner 200 may read the first bar code by removing the shape such as the letter, the watermark, etc. displayed in the second bar code, or moving the shape to an upper or lower direction of the bar code, and recovering the first bar code.

In other words, after recognizing the light source of the bar code scanner 200 through the light source recognition module 450, the first bar code may be recovered from the second bar code by undoing the change of the second bar code.

Also, the electronic payment application according to an embodiment of the present invention may analyze information of the light source collected through the light source recognition module 450 by operating in the background of the terminal 400, and generally analyze a histogram of the light source having a color of the red or green series, compare light source histogram information of cases in which the light source exists and does not exist stored in the storage module 440, and analyze whether the light source of the bar code scanner 200 exists to recognize it.

Subsequently, when outputting the first bar code instead of the second bar code through the output module 420 and recognizing the first bar code recovered in a form which the bar code scanner 200 can read (S217), a POS terminal connected to the bar code scanner 200 may transmit payment information corresponding to the first bar code to the bar code provision server 300, when the electronic payment is completed by the bar code provision server 300, an electronic payment completion state is transmitted to the terminal 400 and the terminal 400 receives the electronic payment completion state, the operation of the light source recognition module 450 may be stopped, and when the first bar code is recovered from the second bar code by the light source recognition module 450 recognizing the light source of the bar code scanner 200 and recovering the second bar code to the first bar code, the operation of the light source recognition module 450 may be stopped (S221).

That is, the operation of the light source recognition module 450 may be maintained until the first bar code is recovered from the second bar code.

The overall operation of the terminal 400 described above may be controlled and performed by the control module 460 of the terminal 400.

The configuration and the operation of the terminal 400 according to the present invention were described above.

Hereinafter, a bar code copy prevention method according to an embodiment of the present invention will be described.

Figure 6:
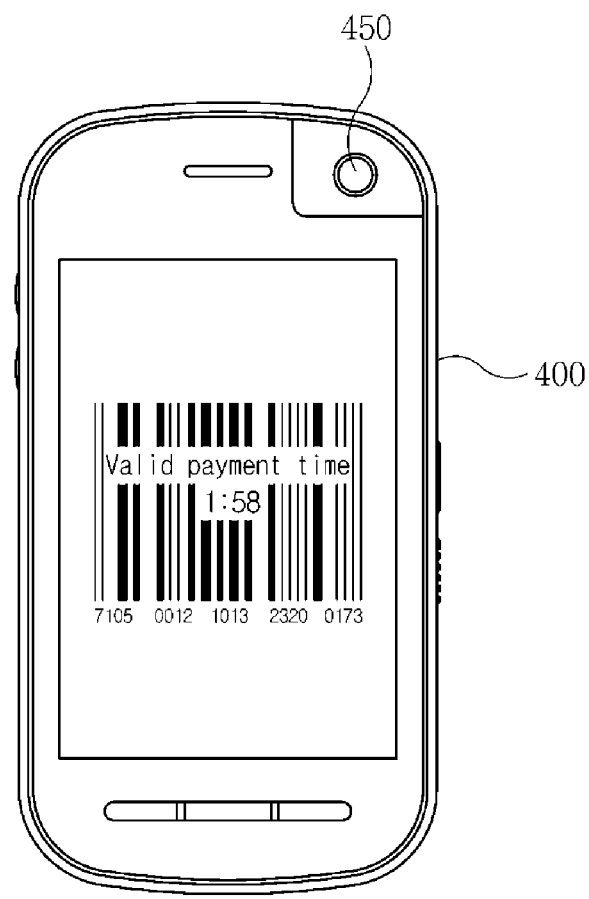
FIGS. 6 to 8 are diagrams for describing an example of a bar code copy prevention method according to an embodiment of the present invention.
Figure 7:
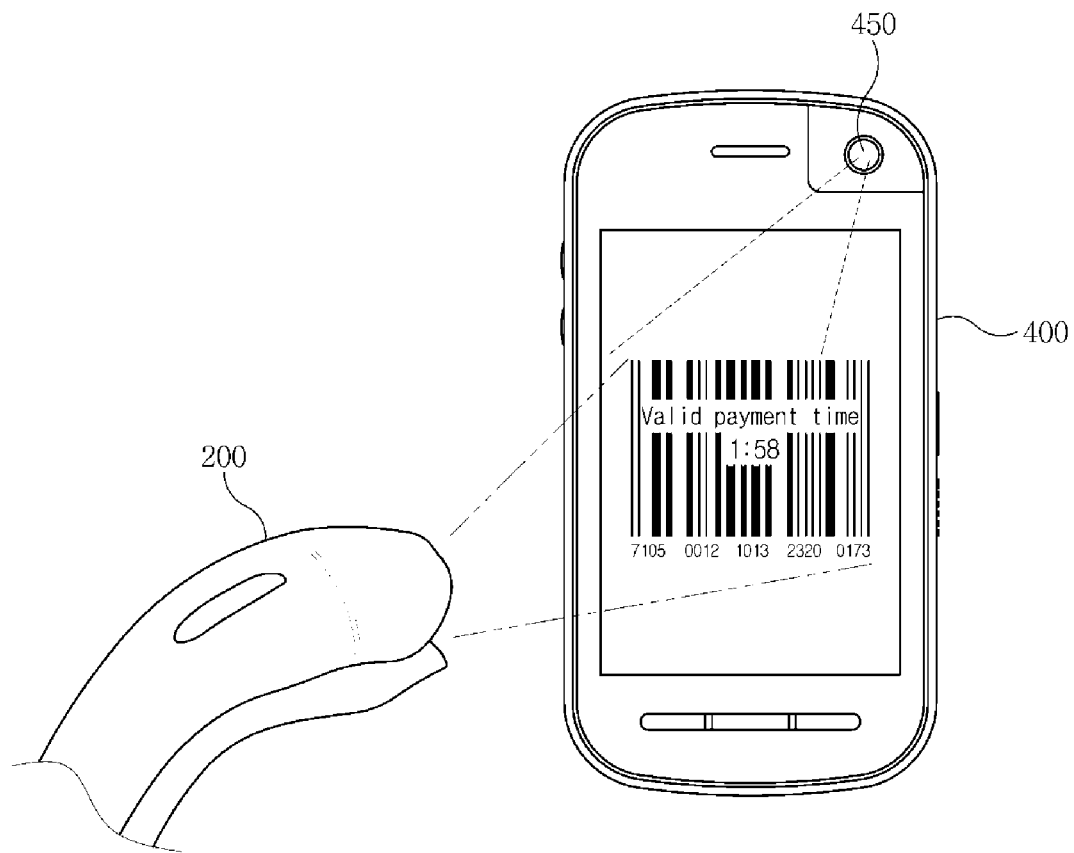
Figure 8:
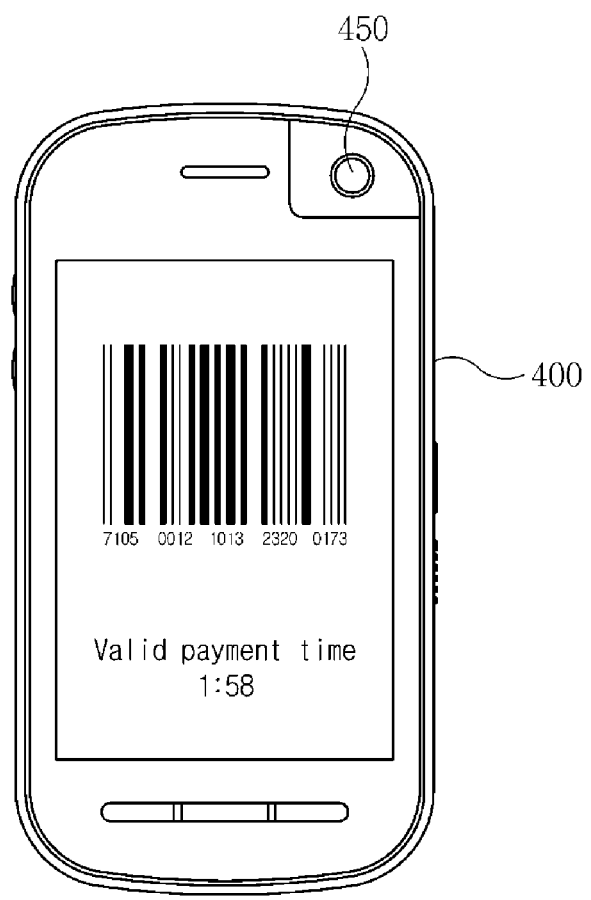

FIGS. 6 to 8 are diagrams for describing the bar code copy prevention method according to an embodiment of the present invention.

FIG. 6 illustrates an example of outputting the second bar code formed in the state which the bar code scanner 200 cannot recognize by changing one portion of the first bar code.

In FIG. 6, an example in which a letter which cannot be recognized by the bar code scanner 200 overlaps the first bar code is illustrated.

That is, an example in which valid payment time information is output to overlap the first bar code so that the bar code scanner 200 cannot recognize the first bar code is illustrate.

In addition to the embodiment described above, there is a method of outputting the second bar code by changing the first bar code to a color which the bar code scanner 200 cannot recognize as described above in the method of outputting the second bar code by changing the first bar code.

When the second bar code in which the first bar code is changed is output to the terminal 400, the light source recognition module 450 may be operated.

After this, as shown in FIG. 7, when the bar code scanner 200 exposes the light source in order to recognize the bar code, the light source recognition module 450 may recognize the light source exposed by the bar code scanner 200.

In this case, as the light source recognition module 450 is installed in the front surface of the terminal 400 as shown in FIG. 7, the light source recognition module 450 may recognize the light source of the bar code scanner 200 exposing the light source toward the front surface of the terminal 400 in order to recognize the bar code for the electronic payment.

When the light source recognition module 450 recognizes the light source of the bar code scanner 200, valid payment time information displayed overlapping the first bar code as shown in FIG. 8 may be output to the output module 420 in the state which the bar code scanner 200 can recognize by moving the valid payment time information to the bottom of the first bar code.

Meanwhile, like the valid payment time information, a letter or shape displayed overlapping the first bar code may be moved to any direction of up, down, left, and right, that is, to a position which does not overlap the first bar code, or be removed.

When the bar code scanner 200 cannot recognize the bar code by a color of at least one portion of the first bar code being changed, the color may be recovered to a color which may be recognized.

The bar code copy prevention method according to an embodiment of the present invention was described above.

Figure 9:
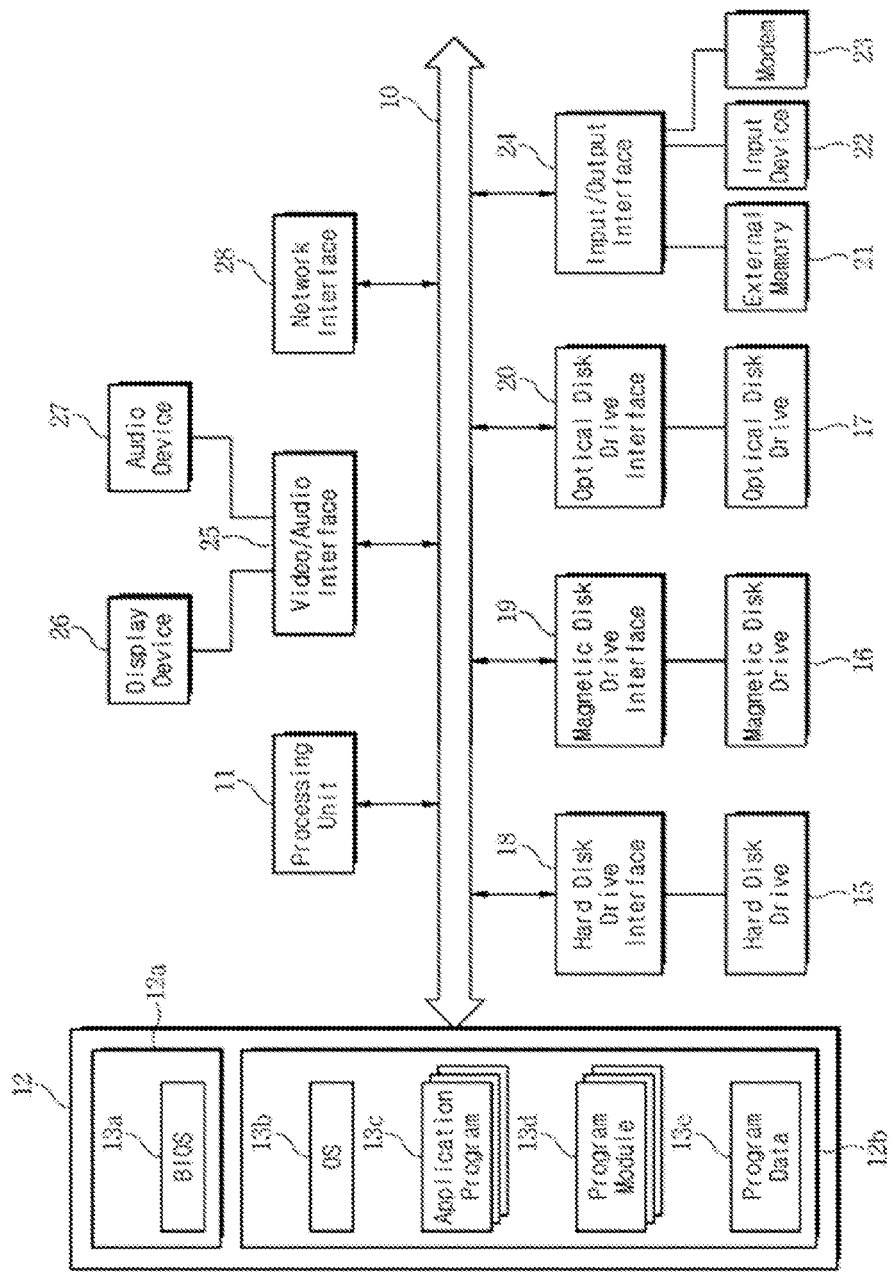
FIG. 9 is a diagram illustrating an operating environment in a service system for preventing a bar code from being copied according to an embodiment of the present invention.

FIG. 9 is a diagram illustrating an operating environment of a device for providing a bar code copy prevention method in a bar code copy prevention system according to an embodiment of the present invention.

FIG. 9 and the following description provide a simple and general description of a suitable computing environment in which the present invention can be implemented.

Although not required, the present invention may be described in a relationship with a computer executable command such as a program module which is executed by a computer system.

Generally, a program module may include a routine, a program, an object, a component, a data structure, etc. performing specific task or implementing a specific abstract data type. A computer executable command, a related data structure, and a program module may be an example of a program code means executing an operation of the invention disclosed herein.

Referring to FIG. 9, an exemplary computing system implementing the present invention may include a computing device configured to include a processing unit 11, a system memory 12, and a system bus 10 connecting various system components including the system memory 12 to the processing unit 11.

The processing unit 11 may execute a computer executable command designed to implement features of the present invention.

The system bus 10 may be a local bus, a peripheral bus, and a memory bus using any one among various bus architectures, or any one among several types of bus structures including a memory controller.

The system memory 12 may include a ROM 12a, and a RAM 12b. A basic input and output system (BIOS) 13a including a basic routine which helps to transmit information between components in the computing system while the computer system boots up may be generally stored in the ROM 12a.

The computing system may include a storage means, and for example, a hard disk drive 15 reading information from a hard disk or recording information in the hard disk, a magnetic disk drive 16 reading information from a magnetic disk or recording information in the magnetic disk, and an optical disk drive 17 reading information from an optical disk such as a CD-ROM, an optical medium, etc., or recording information in the optical disk. The hard disk drive 15, the magnetic disk drive 16, and the optical disk drive 17 may be connected to the system bus 10 by a hard disk drive interface 18, a magnetic disk drive interface 19, and an optical drive interface 20, respectively.

Further, the computing system may further include an external memory 21 as a storage means. The external memory 21 may be connected to the system bus 10 through an input and output interface 24.

The drives described above and the related computer readable medium which is read and recorded by the drives may provide a nonvolatile storage of the computer executable command, the data structure, the program module, and data.

An exemplary environment described herein may include the hard disk drive 15, the magnetic disk drive 16, and the optical disk drive 17, but in addition, other types of computer readable media storing data, including a magnetic cassette, a flash memory card, a digital versatile disc (DVD), a Bernoulli cartridge, a RAM, a ROM, etc. may be used.

A program code means including an OS 13b, one or more application programs 13c, a program module 13d, and one or more program modules including program data 13e, which are loaded and executed by the processing unit 11 may be stored in the hard disk drive 15, the magnetic disk drive 16, the optical disk drive 17, the ROM 12a, or the RAM 12b.

Further, the computing system may receive a command and information from a user through an input device 22 such as a keyboard, a pointing device, a microphone, a joystick, a game pad, a scanner, etc.

The input device 22 may be connected to the processing unit 11 through the input and output interface 24 connected to the system bus 10.

For example, the input and output interface 24 may logically represent any one among various different interfaces such as a serial port interface, a personal system/2 (PS/2) interface, a parallel port interface, a universal serial bus (USB) interface, an Institute of Electrical and Electronics Engineers (IEEE) 1394 interface (that is, a FireWire interface), or logically represent a combination of other interfaces.

Further, the computing system to which the present invention is applied may further include a display device 26 such as a monitor or an LCD, or an audio device 27 such as a speaker or a microphone, and the display device 26 and the audio device 27 may be connected to the system bus 10 through a video/audio interface 25.

For example, a peripheral output device such as a speaker, a printer (not shown), etc. may be connected to the computer system.

The video/audio interface unit 25 may include a high-definition multimedia interface (HDMI), a graphics device interface (GDI), etc.

Further, for example, the computing system performing the present invention may be connected to a network such as an office-wide or business-wide computer network, a home network, an intranet, and/or the Internet.

For example, the computer system may exchange data with external sources such as a remote computer system, a remote application, and/or a remote database through a network.

For this, the computing system to which the present invention is applied may include a network interface 28 receiving data from an external source and/or transmitting data to the external source.

In the present invention, the computing system may transceive information with a device which is located in a remote place through the network interface 28.

For example, when the computing system is the terminal 400, the computing system may transceive information with the bar code provision server 300 through the network interface 28.

Conversely, when the computing system is the bar code provision server 300, the computing system may transceive information with the terminal 400 through the network interface 28.

For example, the network interface 28 may be represented by a logical combination of one or more software and/or hardware modules such as a network interface card and a corresponding network driver interface specification (NDIS) stack.

Similarly, the computer system may receive data from an external source or transmit data to the external source through the input and output interface 24.

The input and output interface 24 may be connected to a modem 23 (for example, a standard modem, a cable modem, or a DSL modem), and receive data from the external source and/or transmit data to the external through the modem 23.

FIG. 9 illustrates an operating environment suitable for the present invention, but a principle of the present invention may be applied to any system capable of implementing the principle of the present invention by a suitable modification if necessary. The environment shown in FIG. 9 is merely an example, and may not represent even a small portion of various environments in which the principle of the present invention can be implemented.

Further, a variety of information generated when determining whether to enter a store according to the present invention may be stored in and accessed from any computer readable medium related to a computing system.

For example, a portion of program modules and a portion of related program data may be included in the OS 13*b*, the application program 13*c*, the program module 13*d*, and/or the program data 13*e*, in order to be stored in the system memory 12.

Further, when a mass storage device such as a hard disk is connected to the computing system, the program module and the related program data may be stored in the mass storage device.

In a network environment, the program module related to the present invention or a portion thereof may be stored in a remote computer system which is connected through the input and output interface 24 of the modem 23 or the network interface 28.

The module may be performed in the distributed environment described above.

As described above, this specification may include details of a plurality of specific implementations, but it is not to be understood as limiting the invention or the scope which can be claimed, and it should be understood as a description related to features of a specific embodiment of this specific invention.

Specific features described herein in the context of an individual embodiment may be implemented by being combined in a single embodiment.

Conversely, in the context of the single embodiment, various features may also be implemented in a plurality of embodiments individually or by a combination of any suitable lower levels. Further, the features may be operated in a specific combination and initially described as claimed, but one or more features may be excluded from the claimed combination in some cases and the claimed combination may be changed into a lower combination or modifications of the lower combination.

Similarly, operations are illustrated in a specific order in the drawings, but it should be understood that it is not necessary for the operations to be performed according to the specific order or the sequential order shown in order to obtain a desirable result, or that every operation must performed.

In a specific case, a multitasking and a parallel processing are preferable. Further, it should be understood that separation of various system components of the embodiments described above is not required in every embodiment, and it should be understood that the program components and the systems described above may generally be integrated into a single software product, or may be packaged in a multiple software product.

Specific embodiments of the subject described herein were described. Other embodiments may be included in the scope of the appended claims. For example, even when operations claimed in the claims are performed in a different order, a desirable result may still be achieved. As an example, an operation shown in the accompanying drawings may not necessarily require a specific shown order or a sequential order in order to obtain the desirable result. In a specific implementation example, multitasking and parallel processing may be preferable.

The description described herein provides the best mode of the present invention, and provides an example which describes the present invention and allows those of ordinary skill in the art to manufacture and use the present invention. This specification does not limit the present invention by the detailed terms proposed herein. Accordingly, although the invention is described in detail with reference to the example described above, it should be understood by those of ordinary skill in the art that other equivalents, modifications, and changes may be made thereto without departing from the spirit and scope of the invention.

Accordingly, the scope of the present invention is not defined by the embodiments described above, and should be defined by the appended claims.

What is claimed is:

1. A bar code copy prevention method, comprising:
    outputting, by a terminal, a second bar code formed in a state which a bar code scanner cannot recognize by changing at least one portion of a first bar code;
    recognizing, by the terminal, a light source of the bar code scanner;
    recovering the first bar code from the second bar code by undoing a change of the second bar code when the terminal recognizes the light source; and
    outputting the first bar code instead of the second bar code.

2. The bar code copy prevention method of claim 1, further comprising, before the outputting of the second bar code;
  transmitting user authentication information input from a user to a bar code provision server;
  receiving the first bar code generated by the bar code provision server from the bar code provision server; and
  changing the received first bar code into the second bar code.

3. The bar code copy prevention method of claim 1, wherein the first and second bar codes are one-time bar codes for an electronic payment.

4. The bar code copy prevention method of claim 3, wherein the one-time bar code has a valid payment time for which an electronic payment using the one-time bar code is available to be performed.

5. The bar code copy prevention method of claim 1, wherein the second bar code is the first bar code of which at least one portion is changed to a color which the bar code scanner cannot recognize.

6. The bar code copy prevention method of claim 1, wherein the second bar code is formed by changing the first bar code so that a letter or a shape which the bar code scanner cannot recognize is displayed to overlap at least one portion of the first bar code.

7. The bar code copy prevention method of claim 1, wherein the recognizing of the light source of the bar code scanner recognizes the light source exposed by the bar code scanner towards a front surface of the terminal to recognize the second bar code.

8. The bar code copy prevention method of claim 1, further comprising, before the outputting of the second bar code;
  generating, by the terminal, the first bar code; and
  changing the first bar code into the second bar code.

9. A non-transitory computer readable recording medium recording a program for executing steps of:
  outputting, by a terminal, a second bar code formed in a state which a bar code scanner cannot recognize by changing at least one portion of a first bar code;
  recognizing, by the terminal, a light source of the bar code scanner;
  recovering the first bar code from the second bar code by undoing a change of the second bar code when the terminal recognizes the light source; and
  outputting the first bar code instead of the second bar code.

10. The non-transitory computer readable recording medium of claim 9, wherein the first and second bar codes are one-time bar codes for an electronic payment.

11. A terminal, comprising:
  a light source recognition module configured to recognize a light source of a bar code scanner;
  an output module configured to expose a bar code to a user; and
  a control module configured to control the terminal to recognize the light source of the bar code scanner through the light source recognition module when outputting a second bar code formed in a state which the bar code scanner cannot recognize by at least one portion of a first bar code being changed through the output module, to release a change of the second bar code, to recover the first bar code from the second bar code, and to output the first bar code instead of the second bar code through the output module.

12. The terminal of claim 11, further comprising:
  a communication module configured to transceive data with a bar code provision server,
  wherein, when transmitting user authentication information input from the user to the bar code provision server through the communication module, the control module receives the first bar code generated by the bar code provision server from the bar code provision server, and changes the received first bar code into the second bar code.

13. The terminal of claim 11, wherein the first and second bar codes are one-time bar codes for an electronic payment.

14. The terminal of claim 13, wherein the one-time bar code has a valid payment time for which an electronic payment using the one-time bar code is available to be performed.

15. The terminal of claim 11, wherein the second bar code is a bar code in which at least one portion of the first bar code is changed to a color which the bar code scanner cannot recognize.

16. The terminal of claim 11, wherein the second bar code is formed by changing at least one portion of the first bar code so that a letter or a shape which the bar code scanner cannot recognize is being displayed to overlap at least one portion of the first bar code.

17. The terminal of claim 11, wherein the control module controls the light source recognition module to be operated when the second bar code is exposed to the user.

18. The terminal of claim 17, wherein the control module controls the light source recognition module to maintain an operation of the light source recognition module until the first bar code is recovered from the second bar code.

19. The terminal of claim 11, wherein the light source recognition module is installed in a front surface of the terminal.

* * * * *